US011311776B2

(12) United States Patent
Jain et al.

(10) Patent No.: US 11,311,776 B2
(45) Date of Patent: Apr. 26, 2022

(54) EXERCISE MONITORING AND COACHING USING AUDIO DEVICES

(71) Applicant: International Business Machines Corporation, Armonk, NY (US)

(72) Inventors: Mohit Jain, Bengaluru (IN); Pratyush Kumar, Guindy (IN); Anup Agarwal, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 16/161,352

(22) Filed: Oct. 16, 2018

(65) Prior Publication Data

US 2020/0114206 A1 Apr. 16, 2020

(51) Int. Cl.
*A63B 24/00* (2006.01)
*G06F 3/16* (2006.01)
*G06K 9/62* (2022.01)
*G06V 40/20* (2022.01)

(52) U.S. Cl.
CPC ...... *A63B 24/0075* (2013.01); *A63B 24/0062* (2013.01); *G06F 3/167* (2013.01); *G06K 9/6267* (2013.01); *G06V 40/23* (2022.01); *A63B 2024/0071* (2013.01); *A63B 2024/0081* (2013.01)

(58) Field of Classification Search
CPC ................................................. A63B 24/0075
USPC ....................................................... 434/247
See application file for complete search history.

(56) References Cited

U.S. PATENT DOCUMENTS

| 6,243,471 B1 | 6/2001 | Brandstein et al. |
| 9,264,151 B1 | 2/2016 | Emigh |
| 9,363,598 B1 | 6/2016 | Yang |
| 9,432,768 B1 | 8/2016 | O'Neill et al. |
| 9,595,997 B1 | 3/2017 | Yang |
| 9,621,984 B1 | 4/2017 | Chu |
| 9,761,011 B2 | 9/2017 | Utsonomiya et al. |

(Continued)

OTHER PUBLICATIONS

Feng Su, "Acoustic Imaging Using a 64-Node Microphone Array and Beamformer System," IEEE International Symposium on Signal Processing and Information Technology (ISSPIT), Dec. 7, 2015 to Dec. 10, 2015, pp. 168-173.

(Continued)

*Primary Examiner* — Kesha Frisby
(74) *Attorney, Agent, or Firm* — Ryan, Mason & Lewis, LLP

(57) ABSTRACT

Methods, systems, and computer program products for exercise monitoring and coaching using audio devices are provided herein. A computer-implemented method includes processing a first set of one or more auditory prompts, wherein the first set of auditory prompts pertains to initiation of at least one activity with respect to a user; detecting, in connection with the first set of auditory prompts, one or more sets of movements being performed by the user, wherein said detecting comprises (i) emitting one or more acoustic waves towards the user and (ii) processing reflection of the one or more acoustic waves from the user; classifying, based on said detecting, the one or more sets of movements as one or more predefined exercises; and generating and outputting a second set of auditory prompts to the user, wherein the second set of auditory prompts pertains to the predefined exercises being performed by the user.

19 Claims, 11 Drawing Sheets

(56) References Cited

U.S. PATENT DOCUMENTS

| | | |
|---|---|---|
| 9,811,311 B2 | 11/2017 | Smus et al. |
| 9,955,281 B1 | 4/2018 | Lyren |
| 2012/0313900 A1 | 12/2012 | Dahl |
| 2013/0044073 A1 | 2/2013 | Christiansson |
| 2013/0245486 A1 | 9/2013 | Simon |
| 2015/0309639 A1 | 10/2015 | Amarilio et al. |
| 2017/0300186 A1 | 10/2017 | Kuhar et al. |
| 2018/0272190 A1* | 9/2018 | Miura ............... G16H 50/30 |
| 2018/0364813 A1 | 12/2018 | Sayah |

OTHER PUBLICATIONS

K. Kalgaonkar et al., "One-Handed Gesture Recognition Using Ultrasonic Doppler Sonar," IEEE International Conference on Acoustics, Speech and Signal Processing (ICASSP), Apr. 19-.

Y.-T Liu et al., "SoundSense: 3D Gesture Sensing Using Ultrasound on Mobile Devices," Research Project, May 2012, 7 pages.

S.J. Lee et al., "Finger Gesture Recognition Using Microphone Arrays," 2014, 5 pages.

R. Nandakumar et al., "FingerIO: Using Active Sonar for Fine-Grained Finger Tracking," ACM Conference on Human Factors in Computing Systems (CHI), May 7-12, 2016, 11 pages.

W. Wang et al., "Device-Free Gesture Tracking Using Acoustic Signals," 22nd Annual International Conference on Mobile Computing and Networking (MobiCom), Oct. 3-7, 2016, pp. 82-94.

S. Yun et al., "Strata: Fine-Grained Acoustic-Based Device-Free Tracking," 15th Annual International Conference on Mobile Systems, Applications, and Services (MobiSys), Jun. 19-23, 2017, pp. 15-28.

S.P. Tarzia et al., "Sonar-Based Measurement of User Presence and Attention," 11th International Conference on Ubiquitous Computing (UbiComp), Sep. 30-Oct. 3, 2009, pp. 89-92.

S. Gupta et al., "SoundWave: Using the Doppler Effect to Sense Gestures," ACM Conference on Human Factors in Computing Systems (CHI), May 5-10, 2012, pp. 1911-1914.

F. Adib et al., "Capturing the Human Figure Through a Wall," ACM Transactions on Graphics (TOG)—Proceedings of ACM SIGGRAPH Asia, Nov. 2015, 13 pages, vol. 34, No. 6.

Werner De Bruijn, "Making All the Right Noises: Shaping Sound with Audio Beamforming," MathWorks Technical Articles and Newsletters, 2013, 6 pages.

google.com, "Your Hands are the Only Interface You'll Need," https://atap.google.com/soli/, Apr. 10, 2018, 8 pages.

D.M. Van Willigen et al., "In-Air Ultrasonic Gesture Sensing with MEMS Microphones," IEEE Sensors, Nov. 2-5, 2014, 4 pages.

Lyons, Rick, "A Quadratic Signals Tutorial: Complex but not Complicated," Apr. 13, 2013, DSPRelated, pp. 1-46 (Year 2013).

Wikipedia, Microsoft Kinect, Sep. 18, 2018.

Morris et al., RecoFit: Using a Wearable Sensor to Find, Recognize, and Count Repetitive Exercises. CHI 2014.

Gupta et al., Soundwave: Using the Doppler Effect to Sense Gestures. CHI 2012.

Adib et al., Capturing the Human Figure Through a Wall. SIGGRAPH 2015.

Wang et al., Device-Free Gesture Tracking Using Acoustic Signals. MobiCom 2016.

Yun et al., Strata: Fine-Grained Acoustic-based Device-Free Tracking. MobiSys 2017.

Kalgaonkar et al., One handed gesture recognition using ultrasonic Doppler sonar. ICASSP 2009.

Tarzia et al., Sonar-based Measurement of User Presence and Attention. Ubicomp 2009.

Nandakumar et al., FingerIO: Using Active Sonar for Fine-Grained Finger Tracking, CHI 2015.

Wikipedia, Google ATAP, https://en.wikipedia.org/w/index.php?title=Google_ATAP&oldid=829859615, Mar. 11, 2018.

\* cited by examiner

EXERCISE MONITORING AND COACHING USING AUDIO DEVICES

FIELD

The present application generally relates to information technology and, more particularly, to exercise tracking techniques.

BACKGROUND

Exercise monitoring is increasingly prevalent in multiple contexts. For example, fitness trackers typically use global positioning system (GPS) and inertial measurement units (IMUs) to process some movements but cannot track many exercises (such as calisthenics). Additionally, exercise trackers, which generally have to be worn on the user's hands and/or legs, are similarly limited to a small number of exercises. Moreover, existing exercise trackers are commonly wearable devices, requiring contact with the user's body while the user performs the exercises, which can be cumbersome.

SUMMARY

In one embodiment of the present invention, techniques for contactless exercise monitoring and coaching using audio devices are provided. An exemplary computer-implemented method can include processing a first set of one or more auditory prompts, wherein the first set of auditory prompts pertains to initiation of at least one activity with respect to a user; detecting, in connection with the first set of auditory prompts, one or more sets of movements being performed by the user, wherein said detecting comprises (i) emitting one or more acoustic waves towards the user and (ii) processing reflection of the one or more acoustic waves from the user; classifying, based on the detecting step, the one or more sets of movements as one or more predefined exercises; and generating and outputting a second set of one or more auditory prompts to the user, wherein the second set of auditory prompts pertains to the one or more predefined exercises being performed by the user.

In another embodiment of the invention, an exemplary computer-implemented method can include generating and outputting a second set of one or more auditory prompts to the user, wherein the second set of auditory prompts comprises an instruction for the user to adjust the position of one or more body parts. Such a method can also include detecting, in connection with the second set of auditory prompts, one or more sets of movements being performed by the user, wherein the detecting comprises (i) emitting a second set of one or more acoustic waves towards the user and (ii) processing reflection of the second set of one or more acoustic waves from the user. Further, such a method includes classifying, based on detecting in connection with the second set of auditory prompts, the one or more sets of movements as one or more predefined exercises, and generating and outputting a third set of one or more auditory prompts to the user, wherein the third set of auditory prompts pertains to the one or more predefined exercises being performed by the user.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes contactless exercise monitoring and coaching using audio devices. At least one embodiment of the invention includes implementing and/or supporting an exercise monitor and coach mechanism via audio-only devices (such as cognitive assistants, smart speakers, etc.) using inaudible acoustic waves. Such an embodiment can include detecting that the user is performing certain exercises by applying beamforming methods to detect user motion with one or more algorithms. Additionally, such an embodiment can also include classifying the detected user movements as one or more exercises from amongst a catalog of supported exercises. Further, one or more embodiments of the invention can include counting the number of repetitions of each exercise and providing audio cues to the user during the performance of each exercise (such as providing instructions, audible counts as the user performs repetitions, etc.).

As further detailed herein, inaudible acoustic waves can be utilized to determine a time to suggest to the user that he or she should perform an exercise or take a break from work. Additionally, such inaudible acoustic waves can be used to segment exercise periods from non-exercise periods and recognize exercises being performed by the user. In the case of non-recognition, one or more embodiments of the invention can include providing feedback to the user with respect to body position of the user (distance and/or direction). At least one embodiment of the invention can also include counting repetitions of the performed exercises, providing instructions and feedback to the user, and tracking user exercise patterns over time.

Figure 1:
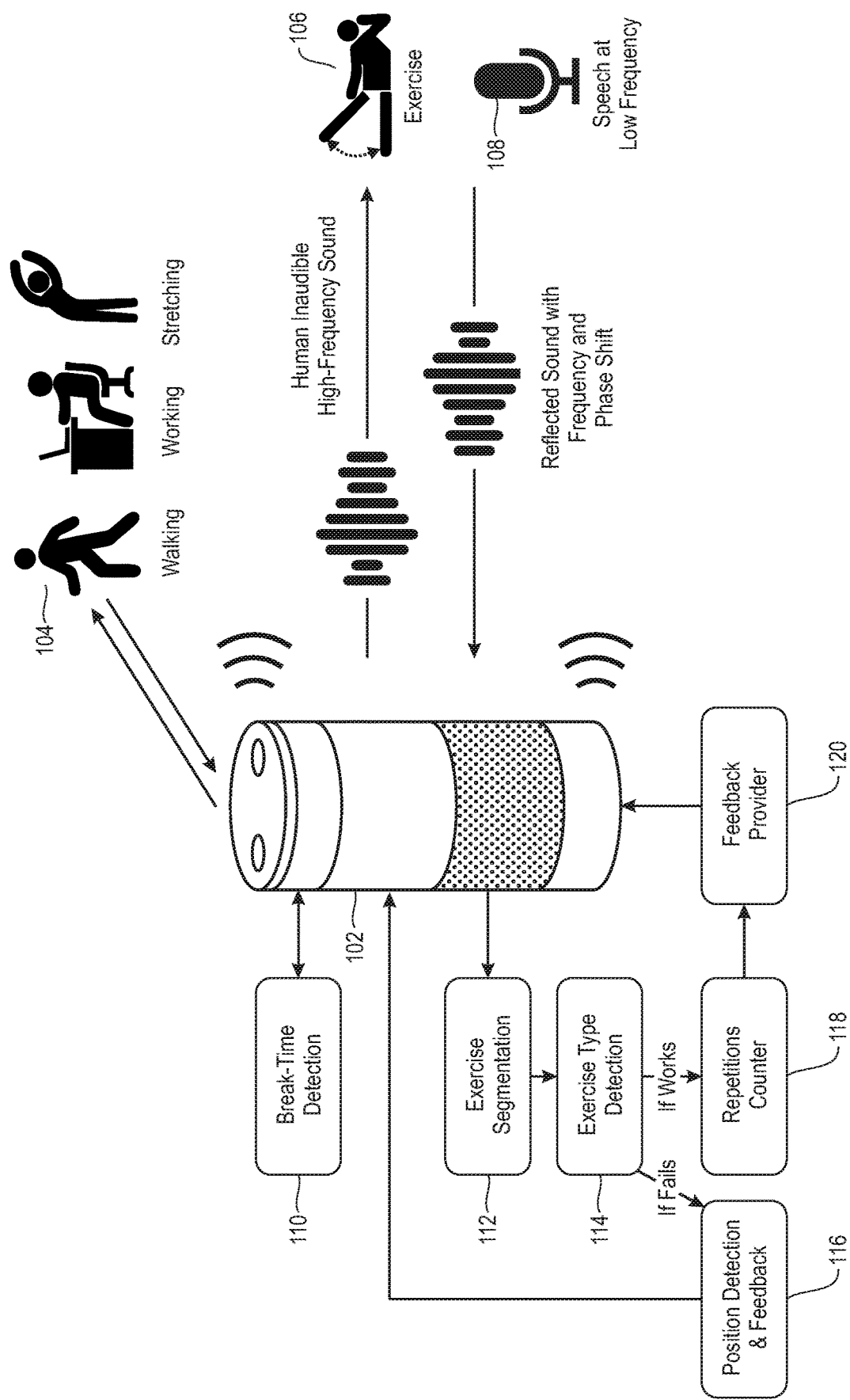
FIG. 1 is a diagram illustrating system architecture, according to an exemplary embodiment of the invention.

FIG. 1 is a diagram illustrating system architecture, according to an embodiment of the invention. By way of illustration, FIG. 1 depicts an audio-only device 102 and multiple (software) components thereof. For example, the device 102 can provide, via a break-time detection component 110, audio cues to the user in step 104 (such as to perform certain stretching exercises, to take a break from work, etc.), if the user has been in the vicinity of the device 102 and inactive for a certain period of time. Additionally, an exercise segmentation component 112 detects, via step 106 (and, optionally, step 108), that the user is performing certain exercises by applying beamforming methods to detect user motion at a distance with one or more algorithms (including Doppler-based algorithms, phase-based algorithms, etc.). Also via step 106 (and, optionally, step 108), a position detection and feedback component 116 can provide audio cues to the user to adjust his or her body position (distance and/or direction) relative to the device, if the device is unable to detect the exercise performed by user. Accordingly, step 106 can include the device emitting human inaudible high-frequency sound towards the user, and step 108 can include the device 102 sensing reflected sound with frequency and phase shift.

As illustrated in FIG. 1, step 108 includes the use of speech at a low frequency, which can include, for example, speech in the human audible range of 20 Hz-20 kHz. Both the speaker and the user will generally be talking in the audible range, using expressions such as, for example, "start exercise counting" (user), "first exercise, first set going on" (device), "two more to go" (device), etc. In one or more embodiments of the invention, a non-audible range (for example, above 20 kHz) is used for tracking exercises, as further detailed herein.

Further, the device can classify, via exercise type detection component 114, the user exercise from amongst a catalog of supported exercises, and can count, via repetition counter component 118, the number of repetitions of each exercise if component 114 can successfully detect the exercise. Also, the device 102 can provide, via feedback provider component 120, audio cues to the user during the performance of the exercise (such as providing instructions, audible repetition counts as the user performs the exercise, etc.).

Figure 2:
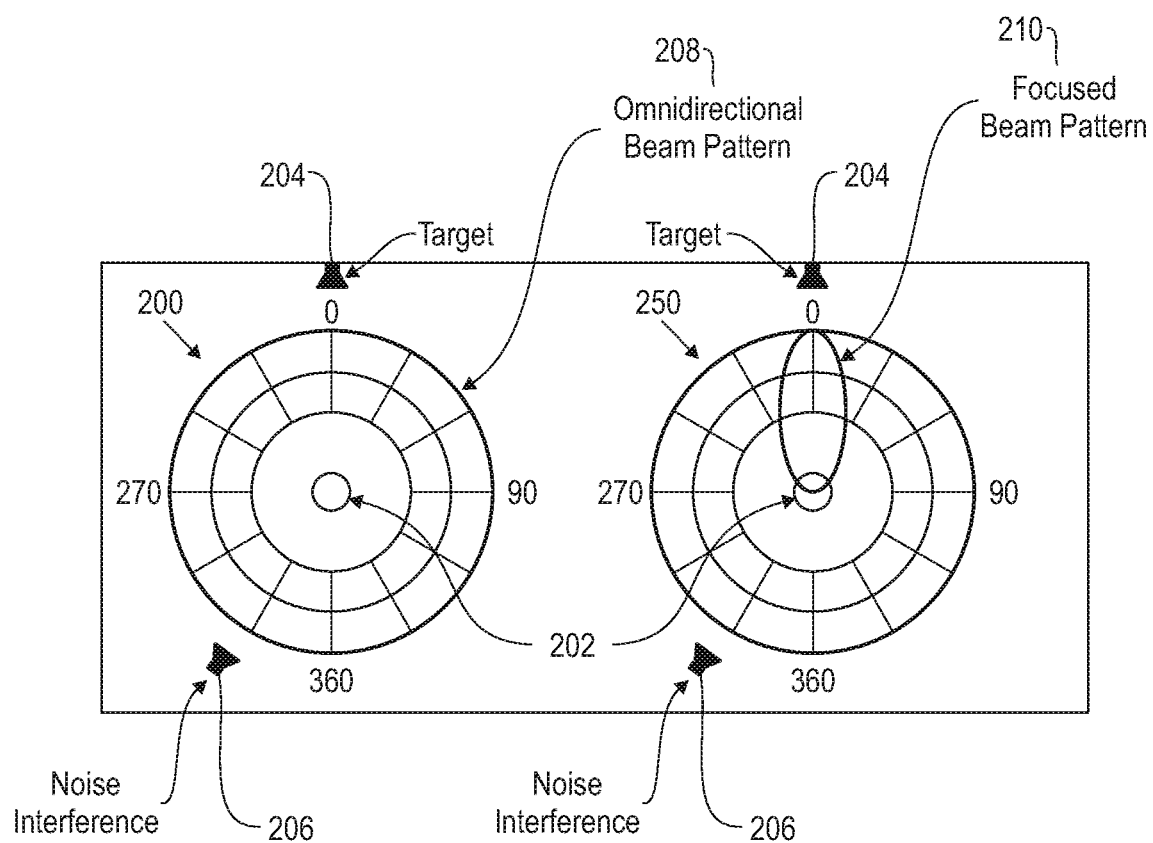
FIG. 2 is a diagram illustrating a far-field array of microphones and beamforming, according to an exemplary embodiment of the invention.

FIG. 2 is a diagram illustrating a far-field array of microphones and beamforming, according to an exemplary embodiment of the invention. By way of illustration, FIG. 2 depicts a microphone 202, relevant audio 204 that the microphone 202 should process, and noise 206 that the microphone 202 should not process. As shown in instance 200, via omnidirectional beam pattern 208, both the relevant sound 204 and the noise 206 will be processed. As shown in instance 250, via a focused beam pattern 210, the microphone 202 can be focused to process only the relevant sound 204, and ignore the noise 206.

Beamforming, as referred to herein, is a signal processing technique that helps achieve directional transmission and/or reception. By way of example, beamforming can be carried out by leveraging a transmitter/receiver array. The signals from the elements of the microphone array are combined in a way such that signals coming from a certain direction in space interfere constructively while others interfere destructively.

Also, as used herein, the Doppler Effect is the apparent shift in frequency of a wave in response to a moving object. This shift can be described by the equation:

$$F_{shift} = F_p * \left(\frac{c+v}{c-v}\right),$$

wherein $F_{shift}$ represents the perceived frequency, $F_p$ represents the frequency emitted by the speaker, c represents the speed of sound in the medium, and v represents the component of velocity towards the microphone/speaker. In one or more embodiments of the invention, for example, the speaker and microphone are stationary, and when there is no moving object in the surrounding environment, there is no frequency shift observed. When a hand/body movement is made, such movement acts as a reflector due to which the frequency perceived by the microphone changes. This change can be directly related to the speed of the hand/body movement, and the frequency emitted by the speaker.

Figure 3:
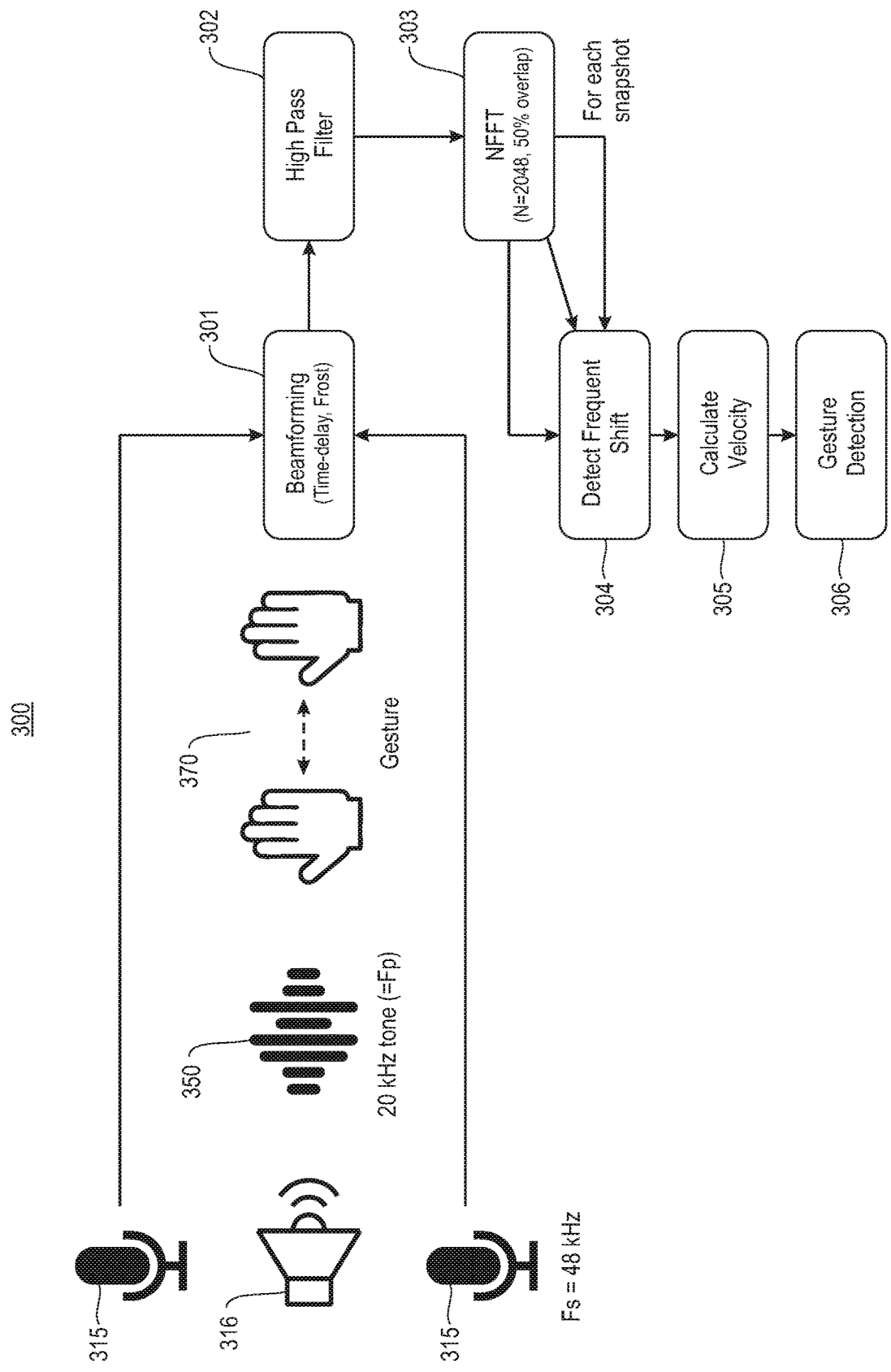
FIG. 3 is a diagram illustrating an example implementation of an exemplary embodiment of the invention.

FIG. 3 is a diagram illustrating an example implementation of an exemplary embodiment of the invention. Referring to FIG. 3, in a system 300 with a voice interactive device (for example, Amazon Echo®, Google Home™, Apple HomePod™) having at least two microphones 315 and a speaker 316, a pilot frequency 350 (e.g., 20 kHz) is emitted by the device, and a gesture 370 causes a reflected waveform (e.g., 19-21 kHz) which is detected using the sampling frequency (e.g., 48 kHz) to be received by one or more of the microphones 315. As detailed herein, beamforming techniques 301, such as, for example, time-delay, Frost, active, etc., are performed to receive the reflected signal in a manner which increases a range of detection of the frequency shift. The beam-formed reflected signal is passed through a high pass filter 302. A beam-formed signal with a frequency higher than a predetermined cutoff frequency (e.g., 19 kHz) is allowed to pass through the high pass filter 302. For example, instead of a peak at 20 kHz (e.g., the peak of the pilot signal), the beam-formed reflected signal will have a different peak (e.g., 19.5 kHz or 21.5 KHz, if, for example, a hand is moving toward or away from the device) and include other variations from the pilot signal (e.g., secondary, tertiary, or broader peak).

The signal from the high pass filter 302 is processed utilizing a non-equi-spaced fast Fourier transform (NFFT) 303 with, for example, 50% overlap between contiguous sections, where N=2048, and the frequency shift caused by the gesture 370 is detected (element 304). At blocks 305 and 306, the velocity of the gesture 370 is calculated, and the gesture 370 is detected. As noted above, each gesture results in a unique deviation (with respect to frequency and/or phase shift) to the pilot signal, which is present in the reflected signal. A machine learning classification method can be used to identify the unique signature caused by a particular gesture.

In connection with step 304, frequency bin size $$\Delta f = \frac{F_S}{NFFT} = 23.43 \text{ Hz},$$

and in connection with step 305, velocity resolution $\Delta v \approx 0.2$ m/s for $F_p = 20$ kHz and $$c = 343 \text{ m/s(speed of sound in air)}. \left(\text{Using: } F_{shift} = F_p * \left(\frac{c+v}{c-v}\right)\right).$$

Figure 4:
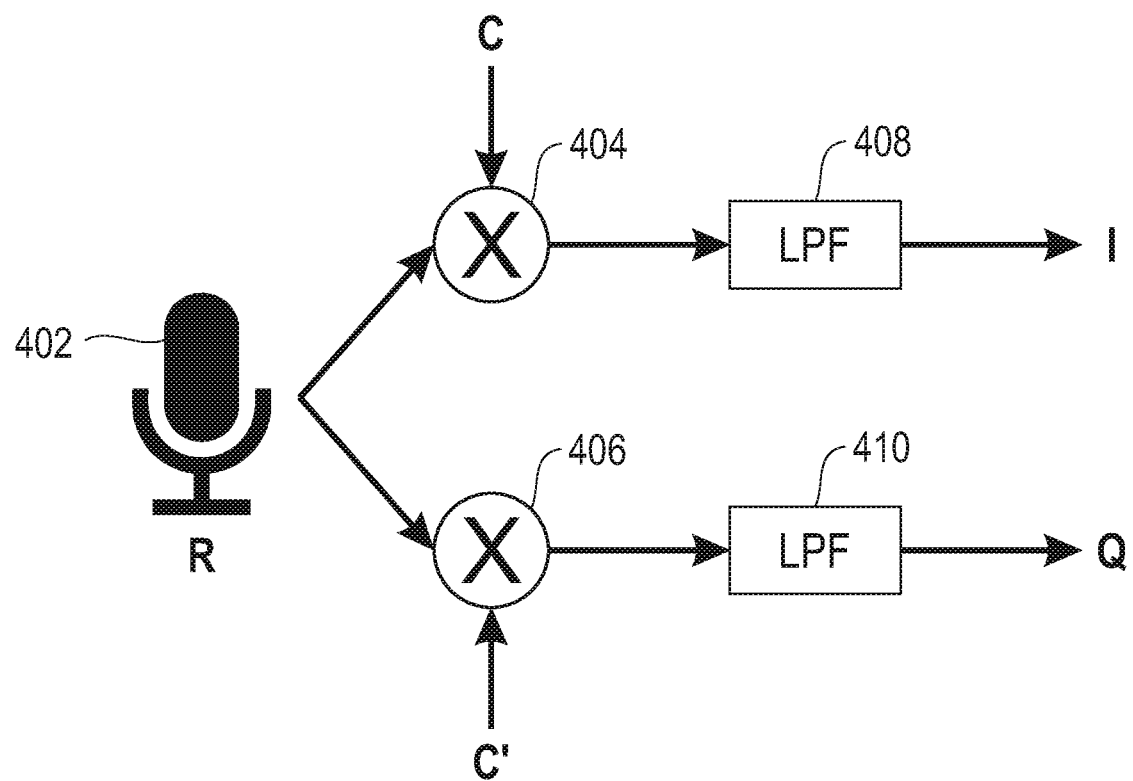
FIG. 4 is a diagram illustrating phase shift information, according to an exemplary embodiment of the invention.

FIG. 4 is a diagram illustrating phase shift information, according to an exemplary embodiment of the invention. By way of illustration, FIG. 4 shows the basic functioning of a typical phase shift algorithm, which can be implemented by one or more embodiments of the invention to classify an exercise. As used in FIG. 4, C refers to the initial carrier signal emitted by the device, C' refers to a 90 degrees phase-shifted version of the initial carrier signal emitted by the device, R 402 refers to a reflected signal from the user that is received by the device, and X 404 and 406 refer to multiplication symbols/functions.

The carrier signal emitted by the device reaches the user who is performing an exercise. The carrier signal gets reflected by the user's exercise motion, and that reflected signal is received by the device.

In one or more embodiments of the invention, an acoustic signal is interpreted as a phase modulated wave. Also, the in-phase (I) and quadrature (Q) components are separated from the carrier. To do this, the received signal is multiplied (separately) with the initial carrier and its 90° phase shifted version, and the two signals are passed through low pass filters 408 and 410 to obtain the I/Q waveforms, respectively. Additionally, in at least one embodiment of the invention, the I/Q waveforms can vary as sinusoids when the hand is moving, and the I/Q waveforms can remain stagnant in the absence of any motion. Accordingly, one or more embodiments of the invention can include and/or implement the following equations:

$$Y(t) = A\cos(2\pi ft), \text{ original signal;}$$

$$R(t) = A'\cos\left(2\pi ft - \frac{2\pi fd(t)}{c} - \theta\right) \text{(wherein theta can be due to static multi-paths while errors in } d(t) \text{ can be due to dynamic multi-paths);}$$

$$I(t) = A'\cos\left(\frac{2\pi fd(t)}{c} + \theta\right);$$

$$Q(t) = A'\sin\left(\frac{2\pi fd(t)}{c} + \theta\right);$$

$$C(t) = A'e\left(\frac{2\pi fd(t)}{c} + \theta\right); \text{ and}$$

$$C_{normalized}(t) = A'e\left(\frac{2\pi fd(t)}{c}\right).$$

When interpreted as a complex vector (I+Q), circles can be traced on the argand plane. The direction of motion can be interpreted from the direction of rotation of the complex vector (anti-clockwise or clockwise). To process the static multi-path effect, the center of circles formed by a complex vector is approximated by taking the mean of two diametrical end-points. This can be carried out for all pairs of peaks in I/Q. Additionally, I and Q can then be normalized using these calculated centers. For the dynamic multi-paths, multiple frequencies can be emitted, and change in distance is approximated from each of these and fitted with linear regression.

Figure 5:
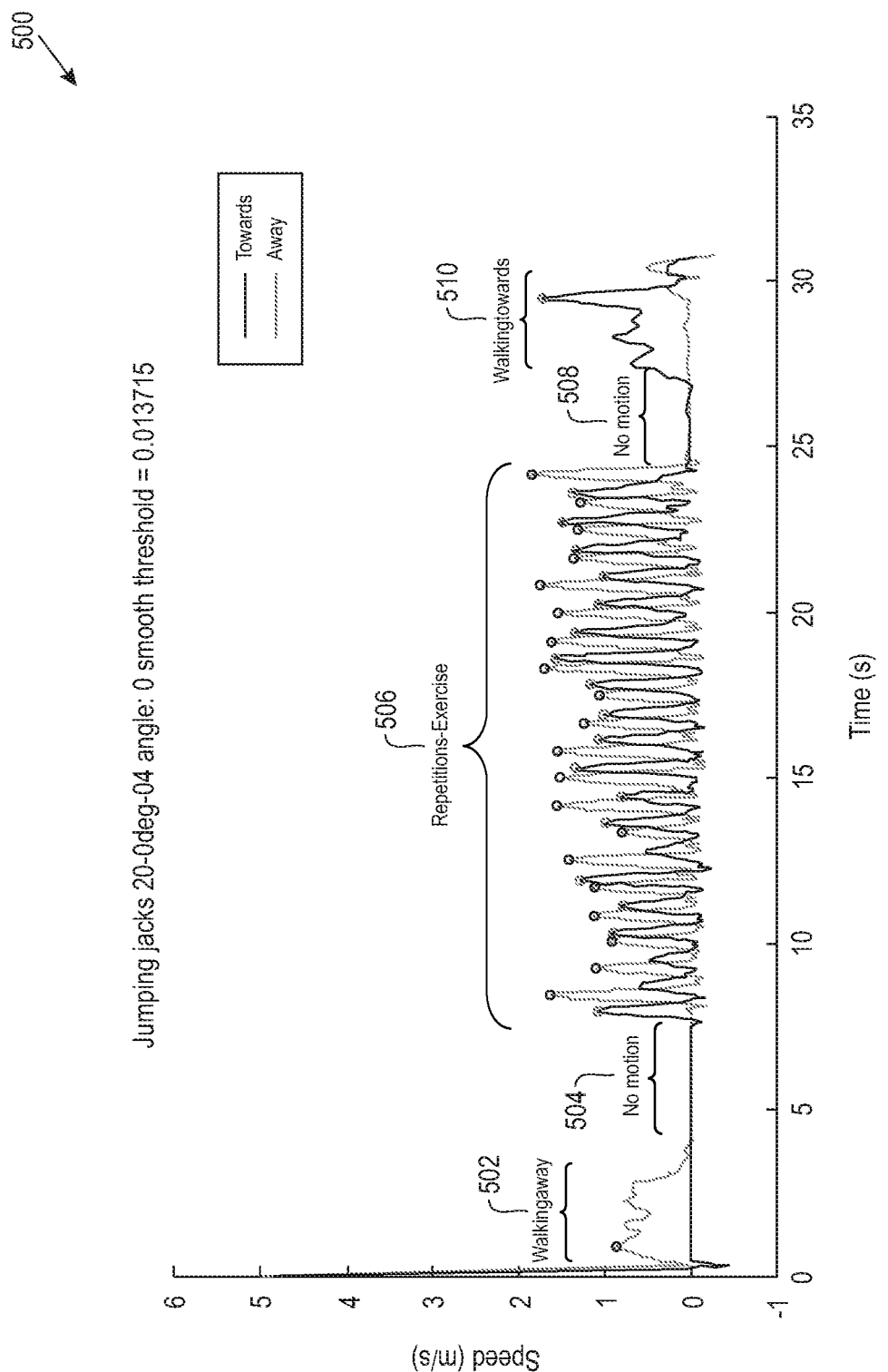
FIG. 5 is a diagram illustrating exercise segmentation, according to an exemplary embodiment of the invention.

FIG. 5 is a diagram illustrating an exercise segmentation graph 500, according to an exemplary embodiment of the invention. As illustrated in FIG. 5, graph 500 depicts exercise segments including a walking away (from the device) segment 502, a segment of no motion 504, a segment of exercise repetitions 506, another segment of no motion 508, and a walking towards (the device) segment 510.

As further detailed herein, exercise is typically more periodic (i.e., repetitive) than non-exercise. Accordingly, at least one embodiment of the invention includes using an autocorrelation function to find regions of self-similar, repetitive exercises. As used herein, an autocorrelation function refers to the cross-correlation of a signal with itself. For example, each value L in the autocorrelation is the convolution of a signal with a version of itself shifted by L samples. If a signal has a strong periodic component at frequency f this will appear as a peak in the autocorrelation at lag I/f. Additionally, autocorrelation of white noise shows no peaks (no periodicity).

Figure 6:
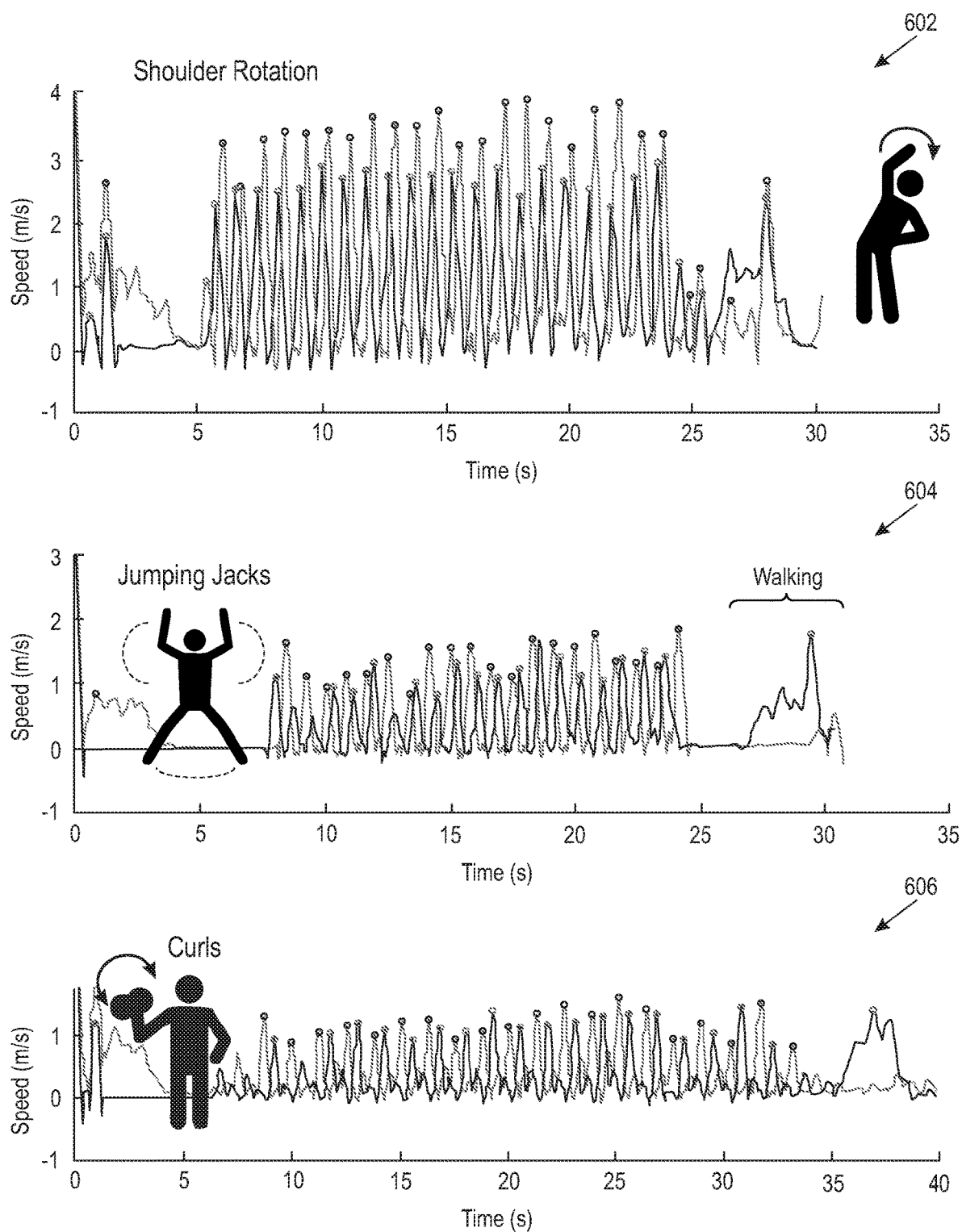
FIG. 6 is a diagram illustrating exercise type detection, according to an exemplary embodiment of the invention.

FIG. 6 is a diagram illustrating graphs of exercise type detection, according to an exemplary embodiment of the invention. By way of illustration, FIG. 6 depicts an example graph 602 illustrating a shoulder rotation exercise, an example graph 604 illustrating jumping jacks and walking, and an example graph 606 illustrating an arm curl exercise. Each exercise requires motion in one or more speeds using one or more particular body parts, thus impacting acoustic frequency and phase differently. Such variations can be classified using one or more machine learning (ML) techniques (including, for example, a support vector machine (SVM)).

At least one embodiment of the invention, using autocorrelation, can include tracking basic activities of the user (such as, for example, the user walking, the user working at a desk, or the user exercising). By exploiting data from multiple microphones, such an embodiment can include determining the direction of the user's activities. Hence, the device in such an embodiment can determine if the person sat in front of the TV, or started working at his/her desk. If the device knows that the person is working at his/her desk, and no major motion is detected for a threshold time (for example, 30 mins), the audio-only device can generate and output an audio cue to the user to take a break from work and carry out one or more exercises.

In the case that the system is unable to detect the exercise performed by the user, there can be multiple possibilities: the system may not be trained to detect this particular exercise, the user might be positioned too far from the device, and/or the user might be performing the exercise at a particular direction (for example, the user may be not facing the device). In the first case, the system can query the user to provide a name of the exercise, and ask the user to perform a given number of repetitions of the exercise, such that the system can train its model with the new exercise. In the second and third cases, the system can generate and provide audio cues to the user, indicated that the user should adjust the position (via distance and/or via direction) of one or more parts of the user's body relative to the device.

Figure 7:
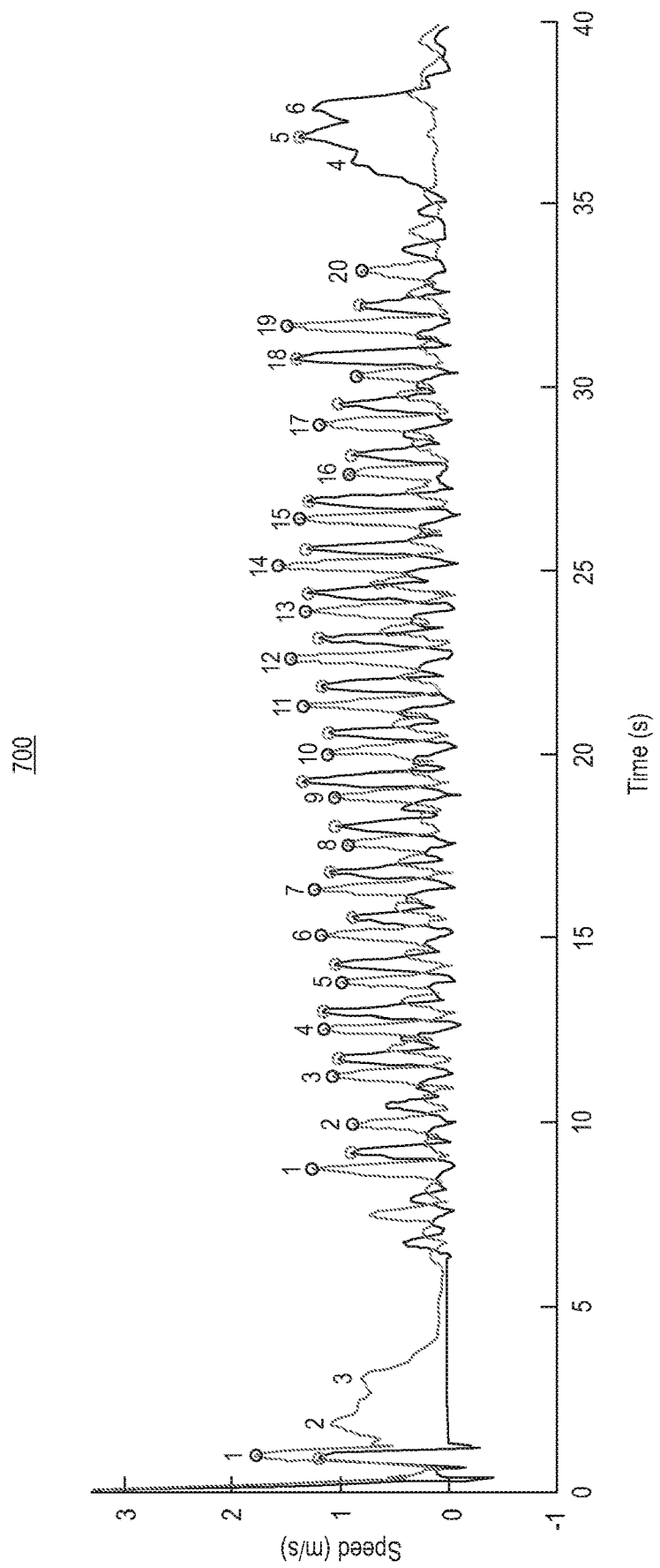
FIG. 7 is a diagram illustrating repetition counting, according to an exemplary embodiment of the invention.

FIG. 7 is a diagram illustrating repetition counting graph 700, according to an exemplary embodiment of the invention. As detailed herein, one or more embodiments of the invention can include implementing an autocorrelation function, and utilizing such a function with peak finding can be used to find repetitions.

Additionally, in one or more embodiments of the invention, a repetition count can be provided, for example, as audible counts to the user in real-time (as he/she performs repetitions). Also, in at least one embodiment of the invention, additional (coach-like) feedback can be provided to the user, such as instructions to perform more exercises, motivational prompts, etc.

Figure 8:
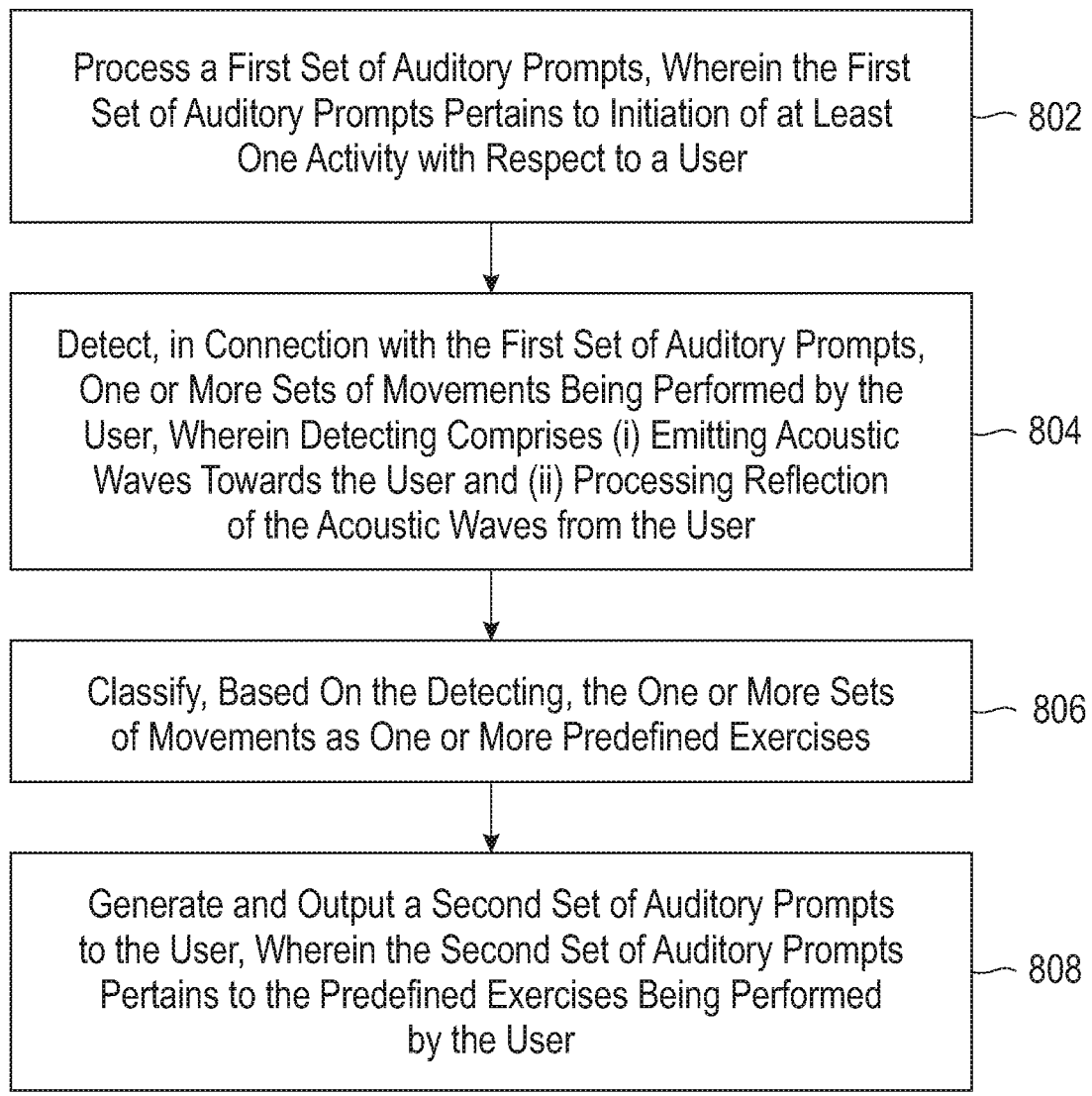
FIG. 8 is a flow diagram illustrating techniques according to an embodiment of the invention.

FIG. 8 is a flow diagram illustrating techniques according to an embodiment of the present invention. Step 802 includes processing a first set of one or more auditory prompts, wherein the first set of auditory prompts pertains to initiation of at least one activity with respect to a user. The first set of auditory prompts can include an instruction, generated and output by the at least one computing device, to perform one or more given exercises and/or an instruction, generated and output by the at least one computing device, to take a break from one or more ongoing activities. Additionally, processing the first set of auditory prompts can include generating and outputting the first set of auditory prompts to the user upon determining that the user has been (i) in the vicinity of the at least one computing device for a given duration of time and (ii) not physically active for the given duration of time. Further, the first set of auditory prompts comprises one or more instructions provided by the user that the user is starting to exercise.

Step 804 includes detecting, in connection with the first set of auditory prompts, one or more sets of movements being performed by the user, wherein said detecting comprises (i) emitting one or more acoustic waves (which can be inaudible to humans) towards the user and (ii) processing reflection of the one or more acoustic waves from the user. Detecting can include implementing one or more beamforming methods. Additionally, detecting can include measuring a shift in the frequency of the one or more acoustic waves, the shift corresponding to at least a portion of the one or more sets of movements performed by the user, and/or measuring a shift in the phase of the one or more acoustic waves, the shift corresponding to at least a portion of the one or more sets of movements performed by the user. Further, the detecting step can be carried out at a given distance from the user.

Step 806 includes classifying, based on said detecting, the one or more sets of movements as one or more predefined exercises. Step 808 includes generating and outputting a second set of one or more auditory prompts to the user, wherein the second set of auditory prompts pertains to the one or more predefined exercises being performed by the user. The second set of auditory prompts can include one or more audible counts of exercise repetitions being performed by the user, one or more words of encouragement, and/or feedback on the user's performance of the one or more predefined exercises.

Steps 802 through 808 can be carried out, for example, by at least one computing device, which can include one or more cognitive assistant devices. The techniques depicted in FIG. 8 can also include counting, based on said detecting, the number of repetitions of each of the one or more exercises being performed by the user. Further, at least one embodiment of the invention includes tracking one or more exercise patterns of the user based at least in part on the one or more predefined exercises being performed by the user.

Also, an additional embodiment of the invention includes generating and outputting a second set of one or more auditory prompts to the user, wherein the second set of auditory prompts comprises an instruction for the user to adjust the position of one or more body parts. The position adjustments can be with respect to distance and/or direction, relative to the device, and the instruction can be generated and output to the user if the device is unable to detect the exercise being performed by user. Such an embodiment can also include detecting, in connection with the second set of auditory prompts, one or more sets of movements being performed by the user, wherein such detecting comprises (i) emitting a second set of one or more acoustic waves towards the user and (ii) processing reflection of the second set of one or more acoustic waves from the user. Additionally, such an embodiment includes classifying, based on the detecting in connection with the second set of auditory prompts, the one or more sets of movements as one or more predefined exercises, and generating and outputting a third set of one or more auditory prompts to the user, wherein the third set of auditory prompts pertains to the one or more predefined exercises being performed by the user.

The techniques depicted in FIG. 8 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 8 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 9:
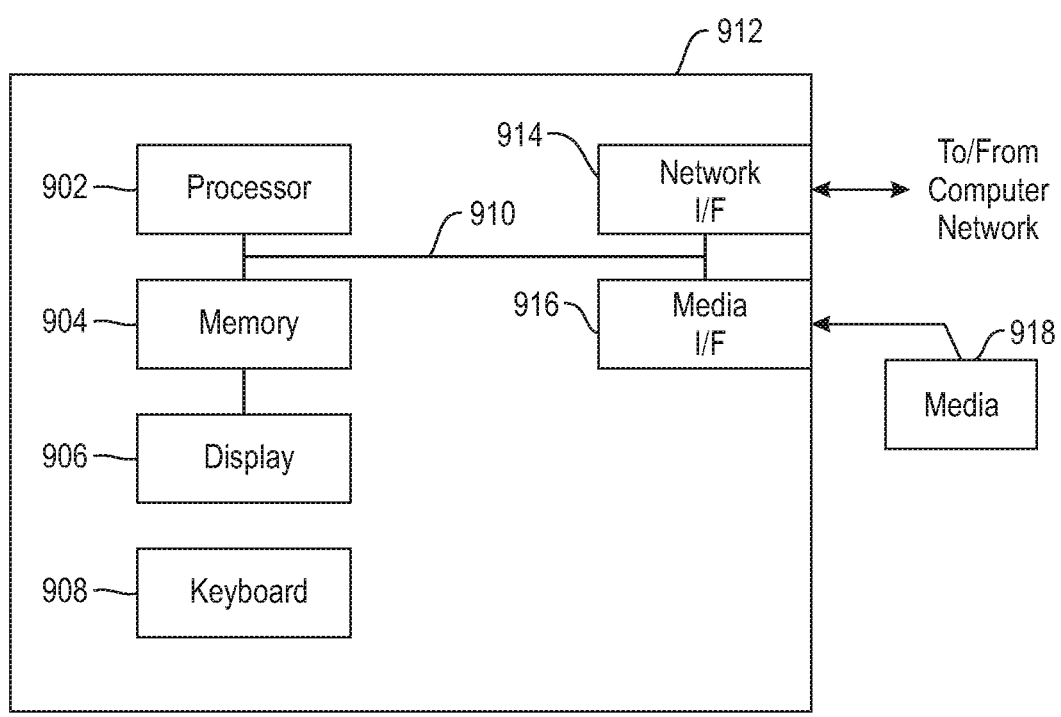
FIG. 9 is a system diagram of an exemplary computer system on which at least one embodiment of the invention can be implemented.

Additionally, an embodiment of the present invention can make use of software running on a computer or workstation. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 902. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
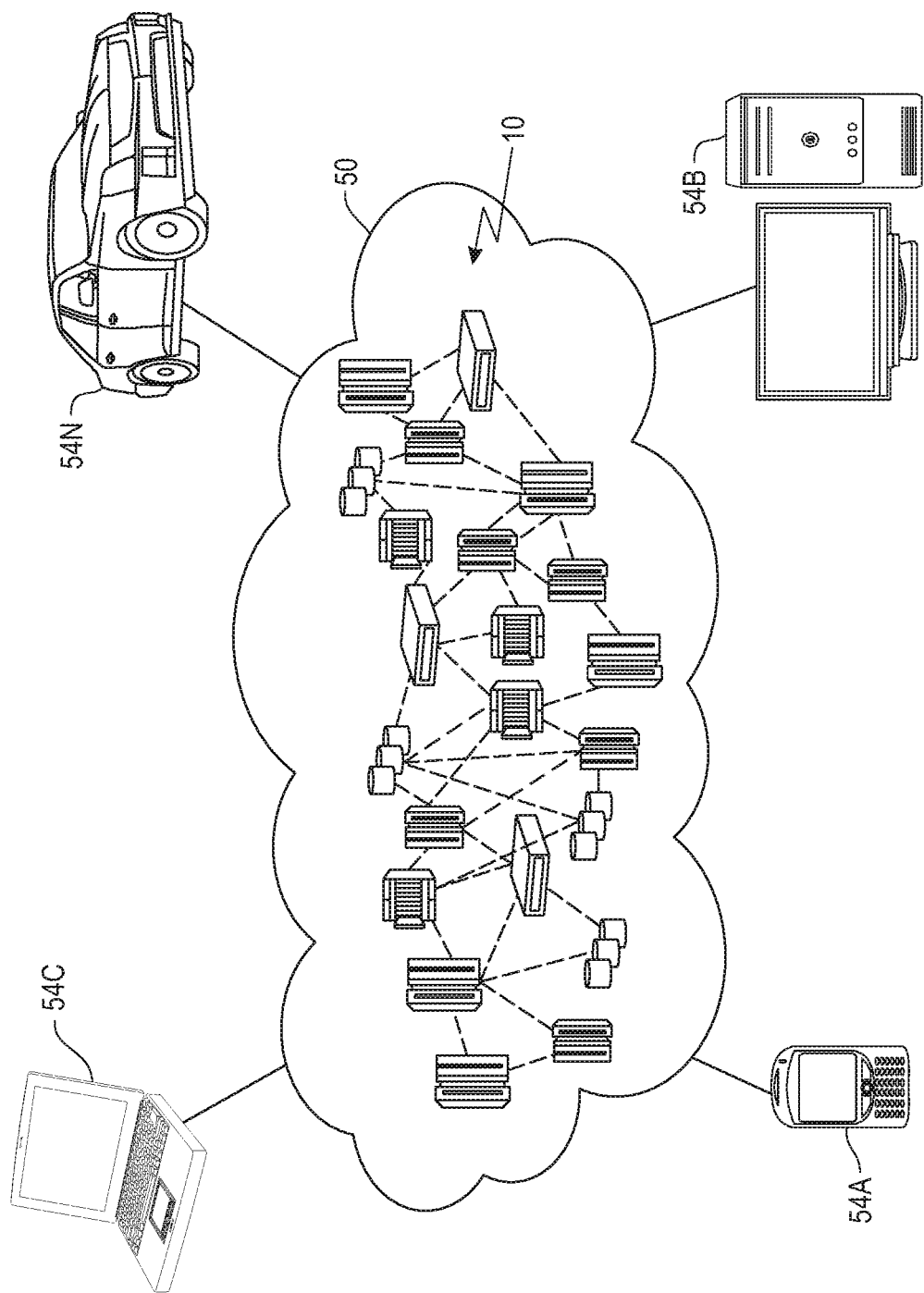
FIG. 10 depicts a cloud computing environment according to an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
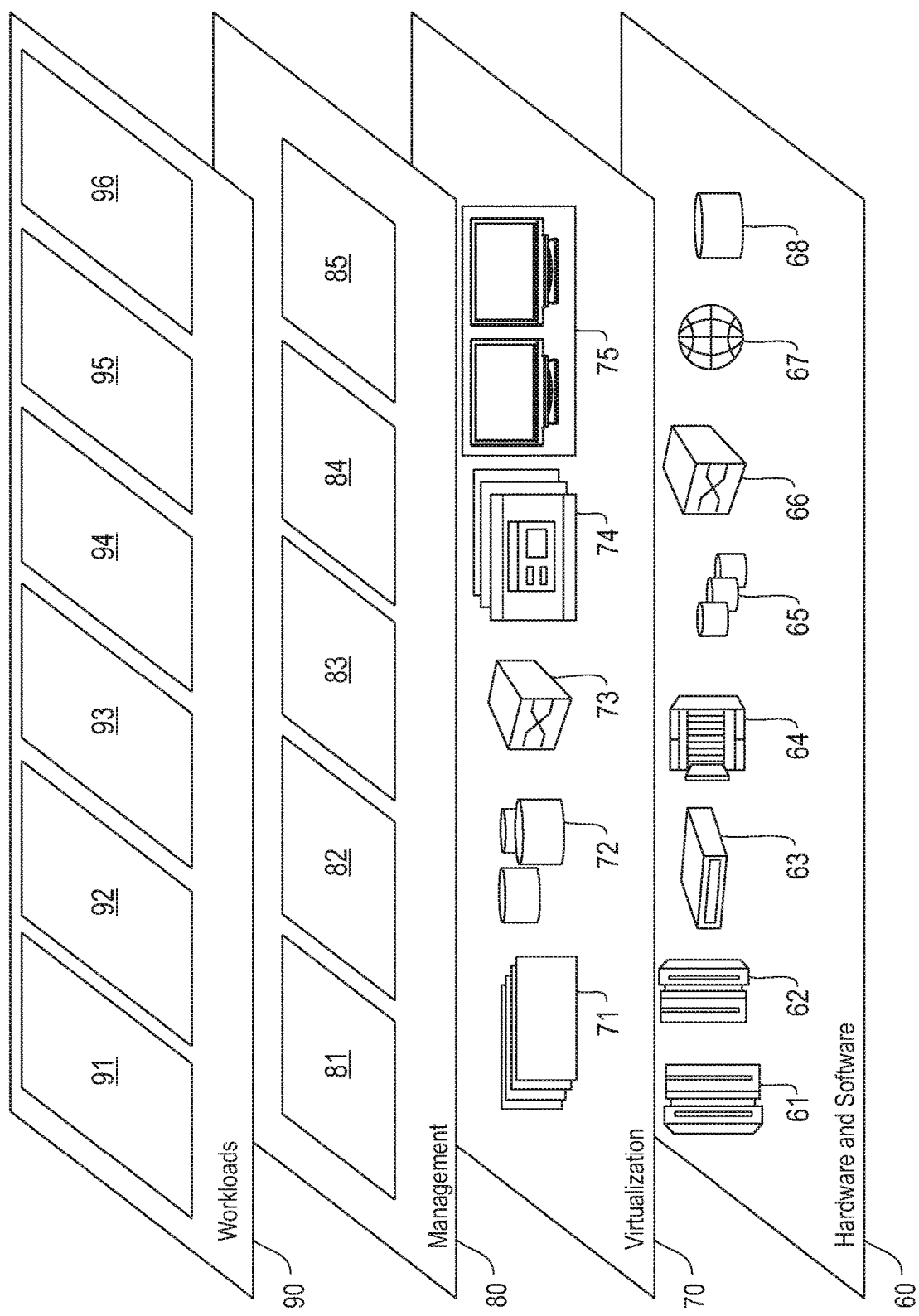
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and exercise monitoring and coaching 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, supporting exercise monitoring and coaching via audio-only devices using inaudible acoustic waves.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   processing a first set of one or more auditory prompts, wherein the first set of auditory prompts pertains to initiation of at least one activity with respect to a user;
   detecting, in connection with the first set of auditory prompts, one or more sets of movements being performed by the user, wherein said detecting comprises (i) emitting one or more acoustic waves towards the user and (ii) processing reflection of the one or more acoustic waves from the user, wherein processing reflection of the one or more acoustic waves comprises:
reflecting the one or more acoustic waves using one or more beamforming methods;
passing at least a portion of the one or more beamformed reflected acoustic waves through a high pass filter configured to allow wave frequencies higher than a predetermined frequency to pass rough the high pass filter; and
processing the at least a portion of the one or more beamformed reflected acoustic waves passed through the high pass filter using a non-equi-spaced fast Fourier transform;
classifying, based on said detecting, the one or more sets of movements as one or more predefined exercises; and
generating and outputting a second set of one or more auditory prompts to the user, wherein the second set of auditory prompts pertains to the one or more predefined exercises being performed by the user;
wherein the method is carried out by at least one computing device.

2. The computer-implemented method of claim 1, wherein the first set of auditory prompts comprises an instruction, generated and output by the at least one computing device, to perform one or more given exercises.

3. The computer-implemented method of claim 1, wherein the first set of auditory prompts comprises an instruction, generated and output by the at least one computing device, to take a break from one or more ongoing activities.

4. The computer-implemented method of claim 1, wherein the first set of auditory prompts comprises one or more instructions provided by the user.

5. The computer-implemented method of claim 1, wherein said processing the first set of auditory prompts comprises generating and outputting the first set of auditory prompts to the user upon determining that the user has been (i) in the vicinity of the at least one computing device for a given duration of time and (ii) not physically active for the given duration of time.

6. The computer-implemented method of claim 1, wherein said detecting comprises measuring a shift in the frequency of the one or more acoustic waves, the shift corresponding to at least a portion of the one or more sets of movements performed by the user.

7. The computer-implemented method of claim 1, wherein said detecting comprises measuring a shift in the phase of the one or more acoustic waves, the shift corresponding to at least a portion of the one or more sets of movements performed by the user.

8. The computer-implemented method of claim 1, wherein said detecting is carried out at a given distance from the user.

9. The computer-implemented method of claim 1, wherein the one or more acoustic waves are inaudible to humans.

10. The computer-implemented method of claim 1, comprising:
counting, based on said detecting, the number of repetitions of each of the one or more exercises being performed by the user.

11. The computer-implemented method of claim 1, wherein the second set of auditory prompts comprises one or more audible counts of exercise repetitions being performed by the user.

12. The computer-implemented method of claim 1, wherein the second set of auditory prompts comprises one or more words of encouragement.

13. The computer-implemented method of claim 1, wherein the second set of auditory prompts comprises feedback on the user's performance of the one or more predefined exercises.

14. The computer-implemented method of claim 1, wherein the at least one computing device comprises one or more cognitive assistant devices.

15. The computer-implemented method of claim 1, comprising:
tracking one or more exercise patterns of the user based at least in part on the one or more predefined exercises being performed by the user.

16. A computer program product comprising a computer readable storage medium having program instructions embodied therewith, the program instructions executable by a computing device to cause the computing device to:
process a first set of one or more auditory prompts, wherein the first set of auditory prompts pertains to initiation of at least one activity with respect to a user;
detect, in connection with the first set of auditory prompts, one or more sets of movements being performed by the user, wherein said detecting comprises (i) emitting one or more acoustic waves towards the user and (ii) processing reflection of the one or more acoustic waves from the user, wherein processing reflection of the one or more acoustic waves comprises:
reflecting the one or more acoustic waves using one or more beamforming methods;
passing at least a portion of the one or more beamformed reflected acoustic waves through a high pass filter configured to allow wave frequencies higher than a predetermined frequency to pass rough the high pass filter; and
processing the at least a portion of the one or more beamformed reflected acoustic waves passed through the high pass filter using a non-equi-spaced fast Fourier transform;
classify, based on said detecting, the one or more sets of movements as one or more predefined exercises; and
generate and output a second set of one or more auditory prompts to the user, wherein the second set of auditory prompts pertains to the one or more predefined exercises being performed by the user.

17. The computer program product of claim 16, wherein the program instructions executable by a computing device further cause the computing device to:
track one or more exercise patterns of the user based at least in part on the one or more predefined exercises being performed by the user.

18. A system comprising:
a memory; and
at least one processor operably coupled to the memory and configured for:
processing a first set of one or more auditory prompts, wherein the first set of auditory prompts pertains to initiation of at least one activity with respect to a user;
detecting, in connection with the first set of auditory prompts, one or more sets of movements being performed by the user, wherein said detecting comprises (i) emitting one or more acoustic waves towards the user and (ii) processing reflection of the one or more acoustic waves from the user, wherein processing reflection of the one or more acoustic waves comprises:

reflecting the one or more acoustic waves using one or more beamforming methods;

passing at least a portion of the one or more beamformed reflected acoustic waves through a high pass filter configured to allow wave frequencies higher than a predetermined frequency to pass rough the high pass filter; and processing the at least a portion of the one or more beamformed reflected acoustic waves passed through the high pass filter using a non-equi-spaced fast Fourier transform;

classifying, based on said detecting, the one or more sets of movements as one or more predefined exercises; and generating and outputting a second set of one or more auditory prompts to the user, wherein the second set of auditory prompts pertains to the one or more predefined exercises being performed by the user.

19. A computer-implemented method, the method comprising:

processing a first set of one or more auditory prompts, wherein the first set of auditory prompts pertains to initiation of at least one activity with respect to a user;

detecting, in connection with the first set of auditory prompts, one or more sets of movements being performed by the user, wherein said detecting comprises (i) emitting a first set of one or more acoustic waves towards the user and (ii) processing reflection of the first set of one or more acoustic waves from the user, wherein processing reflection of the first set of one or more acoustic waves comprises:

reflecting the first set of one or more acoustic waves using one or more beamforming methods;

passing at least a portion of the first set of one or more beamformed reflected acoustic waves through a high pass filter configured to allow wave frequencies higher than a predetermined frequency to pass rough the high pass filter; and processing the at least a portion of the first set of one or more beamformed reflected acoustic waves passed through the high pass filter using a non-equi-spaced fast Fourier transform;

generating and outputting a second set of one or more auditory prompts to the user, based on said detecting, wherein the second set of auditory prompts comprises an instruction for the user to adjust the position of one or more body parts;

detecting, in connection with the second set of auditory prompts, one or more sets of movements being performed by the user, wherein said detecting comprises (i) emitting a second set of one or more acoustic waves towards the user and (ii) processing reflection of the second set of one or more acoustic waves from the user, wherein processing reflection of the second set of one or more acoustic waves comprises:

reflecting the second set of one or more acoustic waves using one or more beamforming methods;

passing at least a portion of the second set of one or more beamformed reflected acoustic waves through a high pass filter configured to allow wave frequencies higher than a predetermined frequency to pass rough the high pass filter; and processing the at least a portion of the second set of one or more beamformed reflected acoustic waves passed through the high pass filter using a non-equi-spaced fast Fourier transform;

classifying, based on said detecting in connection with the second set of auditory prompts, the one or more sets of movements as one or more predefined exercises; and generating and outputting a third set of one or more auditory prompts to the user, wherein the third set of auditory prompts pertains to the one or more predefined exercises being performed by the user;

wherein the method is carried out by at least one computing device.

\* \* \* \* \*